July 24, 1962

R. W. DALEY 3,046,319

ELECTRODE STUB CLAMP

Filed Jan. 20, 1960

United States Patent Office 3,046,319
Patented July 24, 1962

3,046,319
ELECTRODE STUB CLAMP
Robert W. Daley, Troy, N.Y., assignor to Allegheny Ludlum Steel Corporation, Brackenridge, Pa., a corporation of Pennsylvania
Filed Jan. 20, 1960, Ser. No. 3,680
4 Claims. (Cl. 13—14)

This invention relates to improvements in consumable electrode melting and relates in particular to an improved electrode stub clamp.

In the manufacture of high purity alloys, metal is sometimes cast into critical size molds to obtain a shaped ingot that may be employed as an electrode for subsequent re-melting under controlled conditions. For example, high temperature nickel and iron base metals may be produced by conventional air melting means, cast into electrode ingot molds, and the resulting electrode re-melted in a vacuum or inert atmosphere in a consumable electrode furnace. In this manner a superior product, substantially free of inclusions and segregations is obtained. Furnaces designed to effect vacuum electrode melting are generally composed of a vertically mounted ram disposed to receive and support the electrode to be re-melted. The ram extends downwardly into a vacuum chamber and projects the electrode before it, which is thus propelled into a vacuum-sealed crucible where it is consumably arc melted. Stubs or pedestals, such as disclosed in co-pending application Serial No. 756,101, are conventionally provided on one end of the cast electrode for the purpose of connecting the electrode to the end of the ram. The electrode stub is inserted into a clamp that is fixed to the end of the electrode ram.

The requirements of an ideal electrode stub clamp are that they be capable of: Requiring no manual adjustments to attach it to the electrode; aligning the electrode to within one mean degree of plumb automatically; sustaining weights varying from several thousand pounds to less than one hundred pounds with equal ease; conducting up to several thousand amperes of electrical current; operating with an ambient temperature of several hundred degrees F., and; being readily detachable. The prior known devices fail to satisfactorily provide for all the requirements set forth. Such clamps conventionally require manual adjustments or re-adjustments to properly attach the clamp to the electrode and to properly align the electrode in the furnace. Many of the prior known devices have failed in one or more of the above recited requisites, for example, none of the prior known devices is readily detachable.

An electrode stub clamp has now been devised in accordance with the present invention that meets all the above enumerated requirements.

It is, therefore, an object of the present invention to provide an electrode stub clamp that requires no manual adjustments to attach it to the electrode, that is capable of aligning the electrode to within one mean degree of plumb automatically, that will sustain weights varying from several thousand pounds to less than one hundred pounds with equal ease, that is capable of conducting several thousand amperes of electrical current, that will operate with an ambient temperature of several hundred degrees F. and which is readily detachable.

Other advantageous features of the electrode stub clamp of the present application will be obvious from the following specification and drawings wherein.

The electrode stub clamp of the present invention employs the friction between electric current-carrying copper base alloy toggles and the electrode stub for clamping action. The toggles are constructed to permit the electrode to change its angle of plumb by its center of gravity without altering its clamping action. The toggles are preferably constructed with an 8° angle of action and the clamping pressure is thus in proportion to the electrode weight. The toggles and the clamp case are fabricated of a copper base alloy for maximum electrical conductivity. The clamping action of the toggles provides a high pressure electrical contact. The clamp is also constructed in a manner to afford maximum heat transfer to a water cooled ram. The toggles are designed to open when the electrode is forced into the clamp.

A description of a vacuum consumable electrical furnace and ram to which the clamp of the present invention is applicable, is shown in United States Patent No. 2,900,556, issued to P. B. Gifford.

Figures 1, 2:
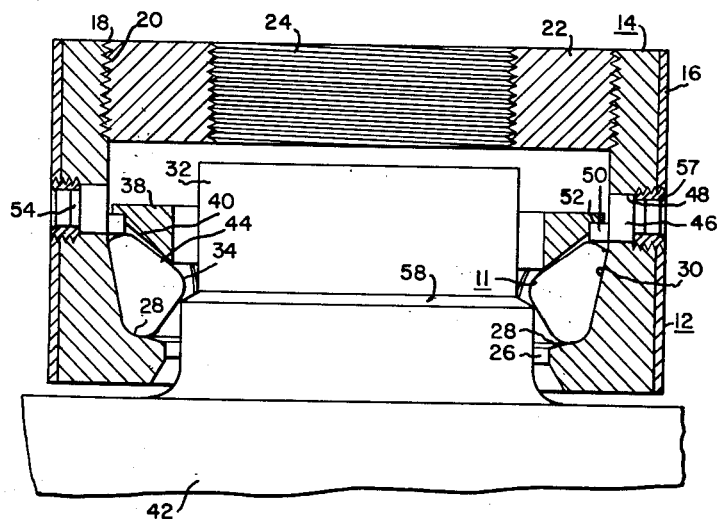
FIGURE 1 is a cross sectional view of an electrode clamp embodying the teaching of the present invention, shown with an electrode stub locked into position in the clamp.
FIG. 2 is a cross sectional view of the clamp of FIG. 1 showing the clamp in an open position.
Figure 3:
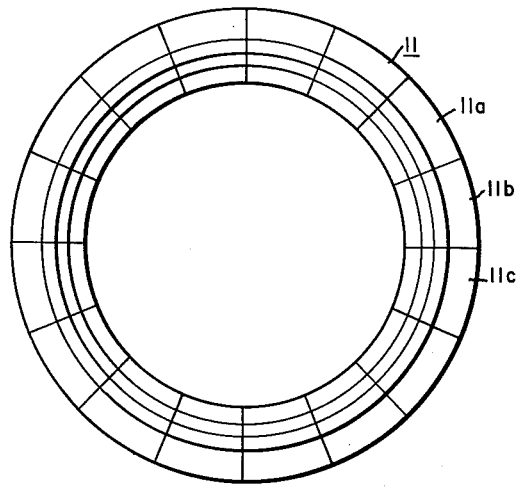
FIG. 3 is a top plan view of a toggle ring utilized in the apparatus of FIG. 1.
Figure 5:
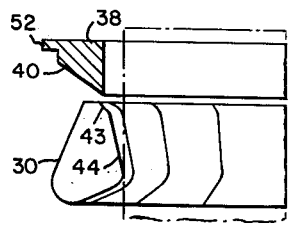
FIG. 5 is a partially side view in elevation of a segment of the toggle ring of FIGS. 1 and 3 shown in the position assumed when the clamp of FIG. 1 is in its closed or electrode engaging position.
Figure 4:
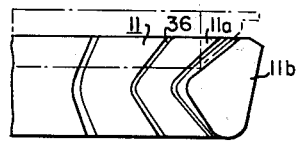
FIG. 4 is a partial side view in elevation of a segment of the toggle ring of FIGS. 1 and 3 shown in the position assumed when the clamp of FIG. 1 is in its open or electrode disengaging position.

The clamp of the present invention particularly as shown in FIGS. 1 and 2 is composed of a housing 12 that consists of a copper base alloy case 14 and a protecting steel jacket 16. The present embodiment contains in its open upper end 18 an internal threaded area 20 into which there is threaded a ram attachment member 22 which also contains an open area 24 which is internally threaded for attachment to the furnace ram. It is to be understood, of course, other attachment arrangements in lieu of member 22 may be readily employed. Housing 14 is formed with a restricted lower opening 26 and a shelf 28 formed around the inside circumference of housing 12. Positioned within the housing 12 and seated on shelf 28 is a toggle ring 11. Toggle ring 11, particularly as shown in FIGS. 3, 4 and 5, is composed of a number of individual toggles several of which are shown in FIG. 3 as 11a, 11b and 11c. When the clamp is in its open position such as is shown by FIG. 2, the toggles are tilted back so that their back surfaces 30 contact that inside surface of the housing case 14. When the toggles 11 are in a position to contact and cause clamping force on electrode stub 32 they are rocked or tilted forward so that their electrode contacting area 34 contacts the electrode stub 32 (note in particular FIG. 1) in a gripping action. The individual toggles such as 11a, 11b and 11c, as shown by FIG. 3 are so spaced in relation to one another that when the clamp is in the electrode disengaging position, a space is provided between each of the toggles such as is shown by FIG. 4 at 36. This is due to the fact that when the toggles are tilted back away from their electrode engaging position, the toggle ring 11 has expanded in diameter to some extent.

In order to control the position of the toggles or segments of toggle ring 11 there is provided a cylindrical drop ring 38 positioned within housing 12 directly above toggle ring 11. Drop ring 38 is formed with a lower beveled surface 40 and is so positioned that when the electrode 42 is projected into the opening 26 of the clamp the fact of engagement or dis-engagement of the toggles is dependent on the position of this member. As shown in FIGS. 2 and 4, when the drop ring 38 is lowered so that beveled surface 40 successively contacts the beveled toggle surfaces 43 and 44, the toggles are rocked outwardly so that their surface 30 contacts the inside surface of case 14. When in this position, it can be seen that no contact is made between the electrode contact area 34 of the toggles and the electrode stub 32. When the drop ring 38 is in its raised position, the toggles are constructed to fall forward so that their electrode contacting area 34 will contact the electrode stub 32 when projected in the opening 26 of the clamp as shown particularly by FIGS. 1 and 5.

Figure 6:
FIG. 6 is an end view of a locking eccentric utilized in the apparatus of FIG. 1.
Figure 7:
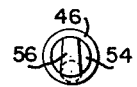
FIG. 7 is an end view of the locking eccentric of FIG. 6, as rotated 180°.

The drop ring 38 is positioned in its raised or lowered position by means of cylindrical shaped eccentrics 46. Two or more cylindrical eccentric members 46 are positioned in openings 48 preferably equally spaced in the electrode clamp housing 12 (composed of case 14 and jacket 16). Each eccentric is retained in a manner to permit rotation within the openings 48. They are provided with drop ring bearing projections 50 as may be observed in FIGS. 1, 6 and 7. Drop ring 38 is provided with a shoulder 52 that bears on the drop ring projections 50 of spaced eccentrics 46. Eccentrics 46 are also provided with key slot projections 54 which project from the eccentric 46 to provide a slot or keyway 56 (see FIG. 7) within the opening 48. Bushings 57 are provided in the openings 48 to provide for a bearing surface for rotation of the eccentrics 46 and to retain the eccentrics 46 within the openings 48. It may be seen that by inserting a key into the slot 56 and rotating eccentric 46 projection 50 which bears on the shoulder 52 of drop ring 38 will cause the drop ring to rise in accordance with the position of the eccentrically located projection 50. When drop ring 38 is in its raised position, the toggles 11a, 11b and 11c fall into their electrode contacting position due to the eccentric position of their centers of gravity. Conversely, when the eccentrics 46 are rotated in a manner to permit drop ring 38 to be lowered so that its beveled surface 40 progressively contacts the surfaces 43 and 44 of the toggles, the toggles will be drawn back in the manner shown in FIG. 2 and will be retained in an electrode disengaging position.

It may be readily seen that the clamp, when in the position shown by FIG. 1 wherein the drop ring 38 is in its raised position, (the electrode clamp) is prepared for engagement with the electrode. The electrode 42 may be projected into the clamp while the clamp is in this position since the edge of the stub 32 when being projected upwardly will push away the individual toggles 11a, 11b and 11c. However, when an attempt is made to withdraw the electrode, the electrode contact area 34 of each toggle will engage the electrode stub and prevent its withdrawal. The electrode is engaged around its entire periphery by the toggles 11a, 11b and 11c etc. The electrode will be self aligning and will be within one mean degree plumb when such a clamp is employed. The segments of toggle ring 11 and the case 14 of housing 12 are preferably fabricated of copper base alloy to permit maximum electrcal current to flow into the stub 32 and hence the electrode 42. Such current is further enhanced by the fact that toggles or segments 11a, 11b and 11c etc. engage the electrode stub around its entire periphery. When it is desired to dis-engage the electrode, a key (not shown) is projected into keyway 56 of eccentrics 46 and the eccentrics are rotated so that the projections 50 are rotated into the position shown in FIG. 2 thus permitting drop ring 38 through its beveled surface 40 to engage the toggles 11a, 11b and 11c and effect a disengagement of the toggles with electrode stub 32. Where the weight of the ring 38 is insufficient to effect disengagement of the frictional engagement of the toggles with the end of the electrode, relative movement between the electrode stub and the toggles may be relied upon to force the shoulders 58 of the stub against the lower edge of engaging surface 34 of the toggle segments to effect rotation thereof to thereby cooperate with the ring 38 to effect a complete disengagement (see FIG. 2).

It is highly desirous that the clamp case 14 and the toggles 11, as well as other members such as member 22 through which high amperage electrical current must flow be fabricated from copper base alloy; however, such members as drop ring 38, eccentric 46 and jacket 16 are more conventionally fabricated from steel.

It is to be understood that the embodiment set forth in the drawings and description thereof are illustrative only, and do not restrict the scope of the application or claims to the exact structures set forth.

I claim:

1. An electrode stub clamp comprising a housing and a ring-shaped toggle member positioned within said housing, said housing being formed with an opening disposed to receive an electrode stub, a shelf formed around the inside circumference of said housing, said shelf being disposed to seat said ring-shaped toggle member, said ring-shaped toggle member being formed of a multiplicity of individual segments, each said segment being disposed to tilt on said shelf so as to extend over the edge of said shelf and project into the said opening in said housing.

2. An electrode stub clamp comprising a housing and a ring-shaped toggle member positioned within said housing, said housing being formed with an opening disposed to receive an electrode stub, a shelf formed around the inside circumference of said housing, said shelf being disposed to seat said ring-shaped toggle member, said ring-shaped toggle member being formed of a multiplicity of individual segments, each said segment being disposed to tilt on said shaft so as to extend over the edge of said shelf and project into the said opening in said housing so that when said electrode stub is projected into said opening it will engage said segments and cause them to tilt away from said opening on said shelf and permit said electrode stub to project freely into said housing but when an attempt is made to withdraw said electrode stub the friction caused by contact of the said segments of said toggle ring will prevent its free withdrawal.

3. An electrode stub clamp comprising a housing and a ring-shaped toggle member positioned within said housing, said housing being formed with an opening disposed to receive an electrode stub, a shelf formed around the inside circumference of said housing, said shelf being disposed to seat said ring-shaped toggle member, said ring-shaped toggle member being formed of a multiplicity of individual segments, each said segment being disposed to tilt on said shelf so as to extend over the edge of said shelf and project into the said opening of said housing so that when said electrode stub is projected into said opening it will engage said segments and cause them to tilt away from said opening on said shelf and permit said electrode stub to project freely into said housing but when an attempt is made to withdraw said electrode stub the friction caused by contact of the said segments of said toggle ring will prevent its free withdrawal, and means for tilting said segments away from contact with said electrode stub.

4. An electrode stub clamp comprising a housing and a ring-shaped toggle member positioned within said housing, said housing being formed with an opening disposed to receive an electrode stub, a shelf formed around the inside circumference of said housing, said shelf being disposed to seat said ring-shaped toggle member, said ring-shaped toggle member being formed of a multiplicity of individual segments, each said segment being disposed to tilt on said shelf so as to extend over the edge of said shelf and project into the said opening in said housing, said segments being formed to bear on one another when extending over the edge of said ledge, a second ring-shaped member positioned within said housing above said ring-shaped toggle member, said second ring-shaped member being formed with a beveled edge, said second ring-shaped member and beveled edge being disposed to contact said segments when said ring is lowered to force said segments to tilt away from said opening, and means for raising and lowering said second ring-shaped member.

References Cited in the file of this patent

UNITED STATES PATENTS 2,592,517    Ingelsrud _____ Apr. 8, 1952